(12) United States Patent
Kay

(10) Patent No.: US 6,374,959 B1
(45) Date of Patent: Apr. 23, 2002

(54) DISC BRAKE BACKING PLATES

(75) Inventor: Joseph A. Kay, Highland, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/085,985

(22) Filed: May 27, 1998

(51) Int. Cl.⁷ .............................................. F16D 69/00
(52) U.S. Cl. ............. 188/73.1; 188/250 R; 188/250 B; 188/73.2; 188/71.1
(58) Field of Search ............................... 188/71.1, 73.1, 188/73.2, 73.31, 250 R, 258, 250 B, 71.7, 250, 73.39

(56) References Cited

U.S. PATENT DOCUMENTS

| | | | | |
|---|---|---|---|---|
| 4,220,223 A | * | 9/1980 | Rinker et al. | 188/73.1 |
| 4,373,615 A | * | 2/1983 | Melinart | 188/73.1 |
| 4,823,920 A | | 4/1989 | Evans | |
| 5,236,068 A | | 8/1993 | Nagai et al. | 188/71.7 |
| 5,289,903 A | * | 3/1994 | Nagai et al. | 188/71.7 |
| 5,355,986 A | * | 10/1994 | Biswas | 188/258 |
| 5,515,950 A | * | 5/1996 | Kwolek | 188/73.36 |

FOREIGN PATENT DOCUMENTS

GB 1065267 4/1967

\* cited by examiner

Primary Examiner—Douglas C. Butler
(74) Attorney, Agent, or Firm—Carlson, Gaskey & Olds

(57) ABSTRACT

Shoe and lining assemblies for use in disc brakes are disclosed that have centroids of the backing plate halves which are very close to the centroids of the actuator pistons. In this way, the forces from the pistons are evenly distributed across the backing plate surface area to result in better braking operation.

3 Claims, 5 Drawing Sheets

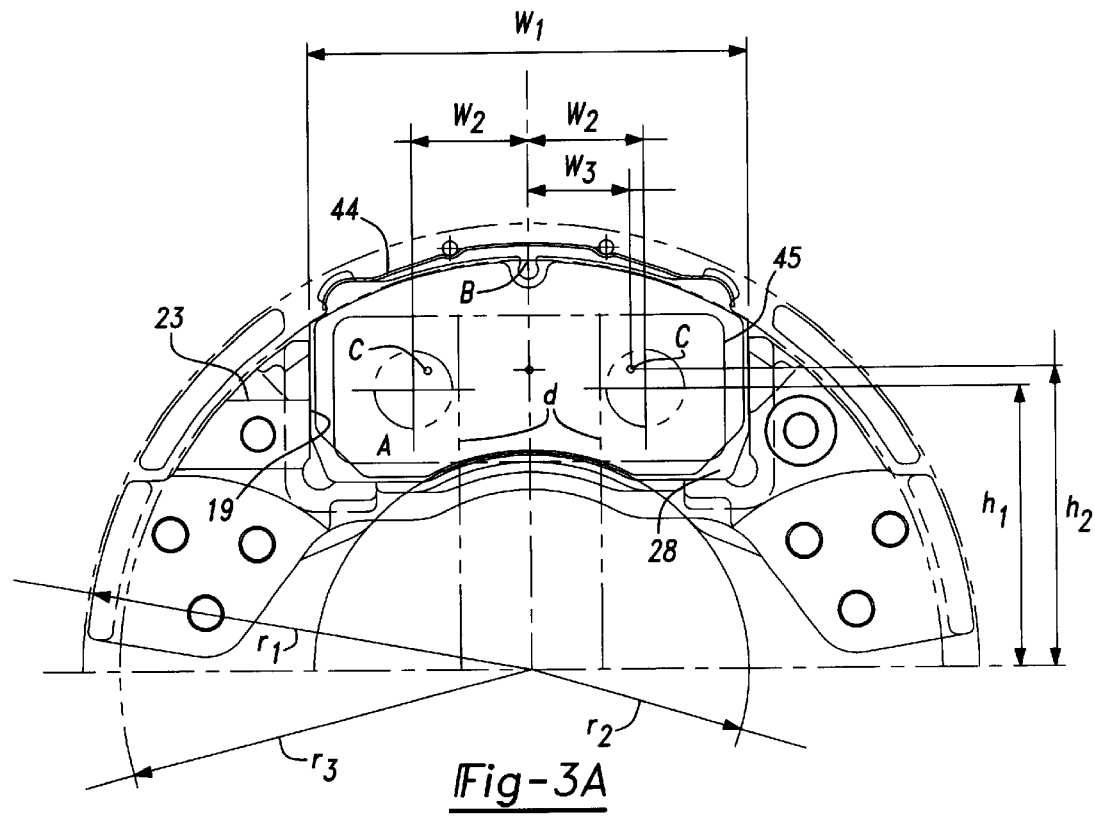
Fig-3A
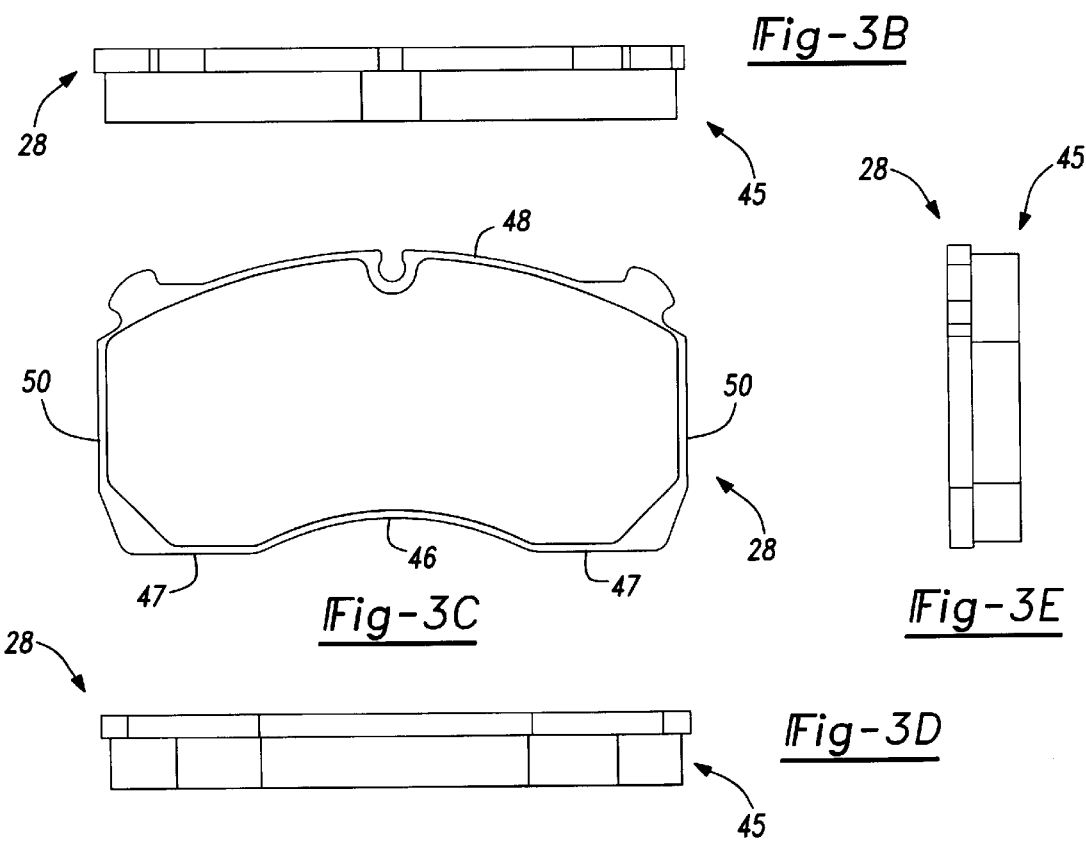
Fig-3B
Fig-3C
Fig-3D
Fig-3E

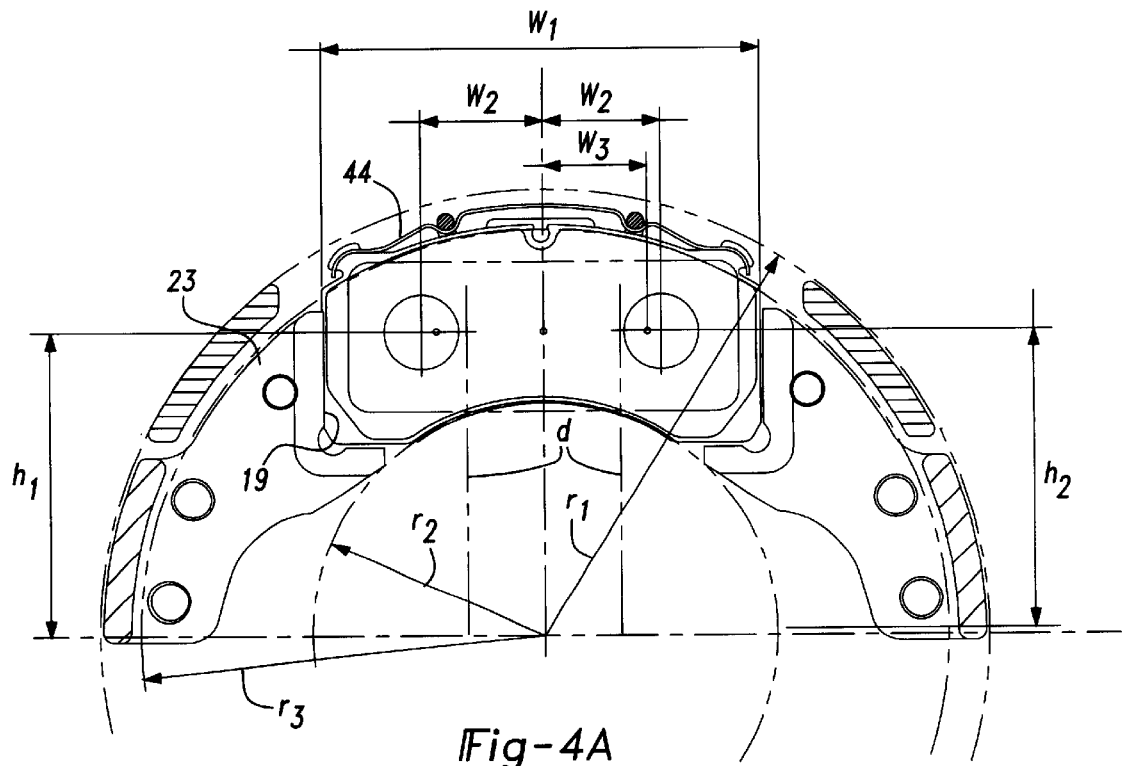
*Fig-4A*
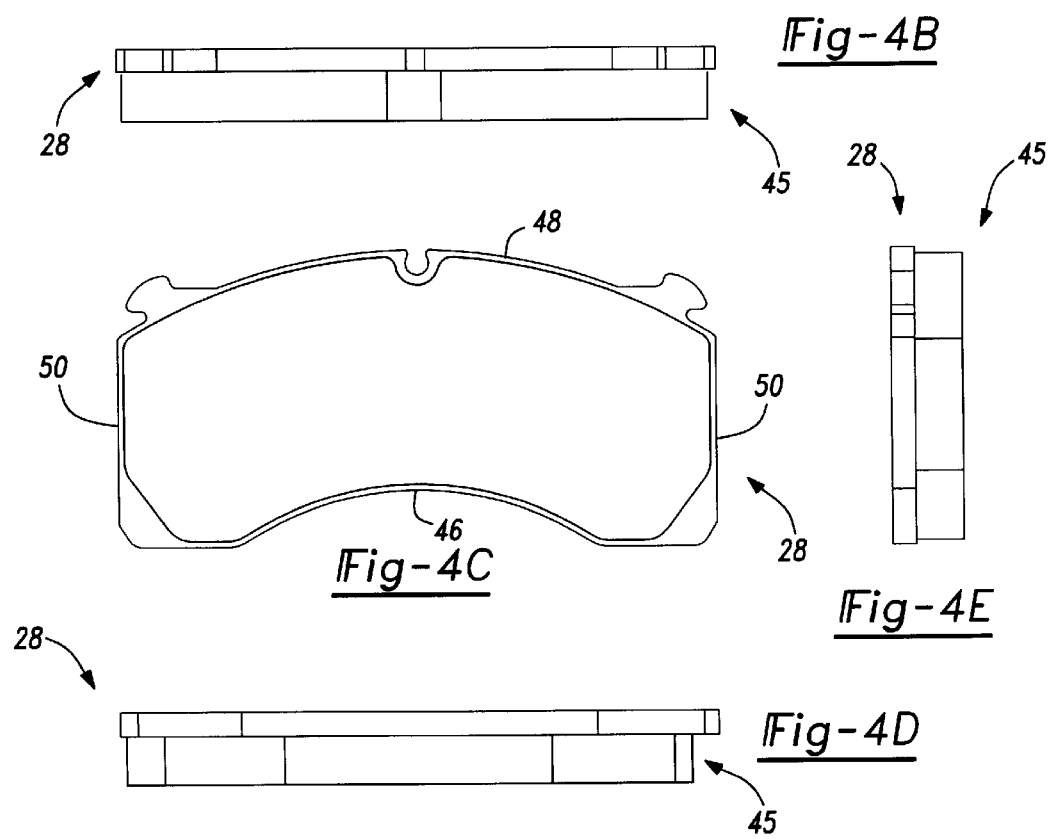
*Fig-4B*
*Fig-4C*
*Fig-4D*
*Fig-4E*

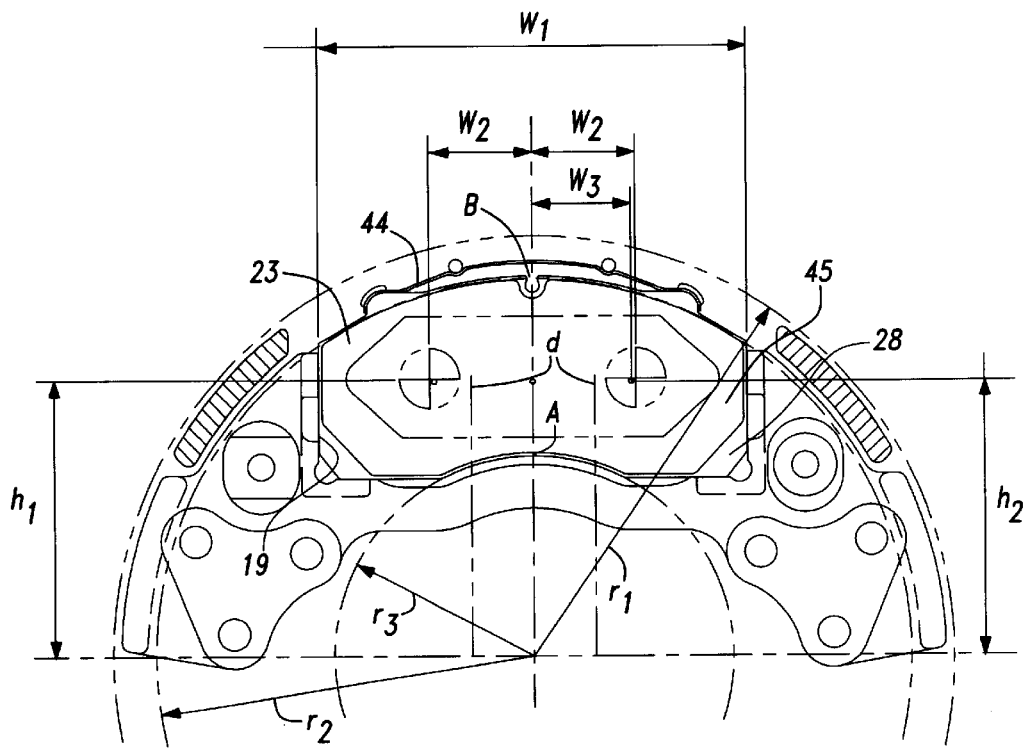
Fig-5A
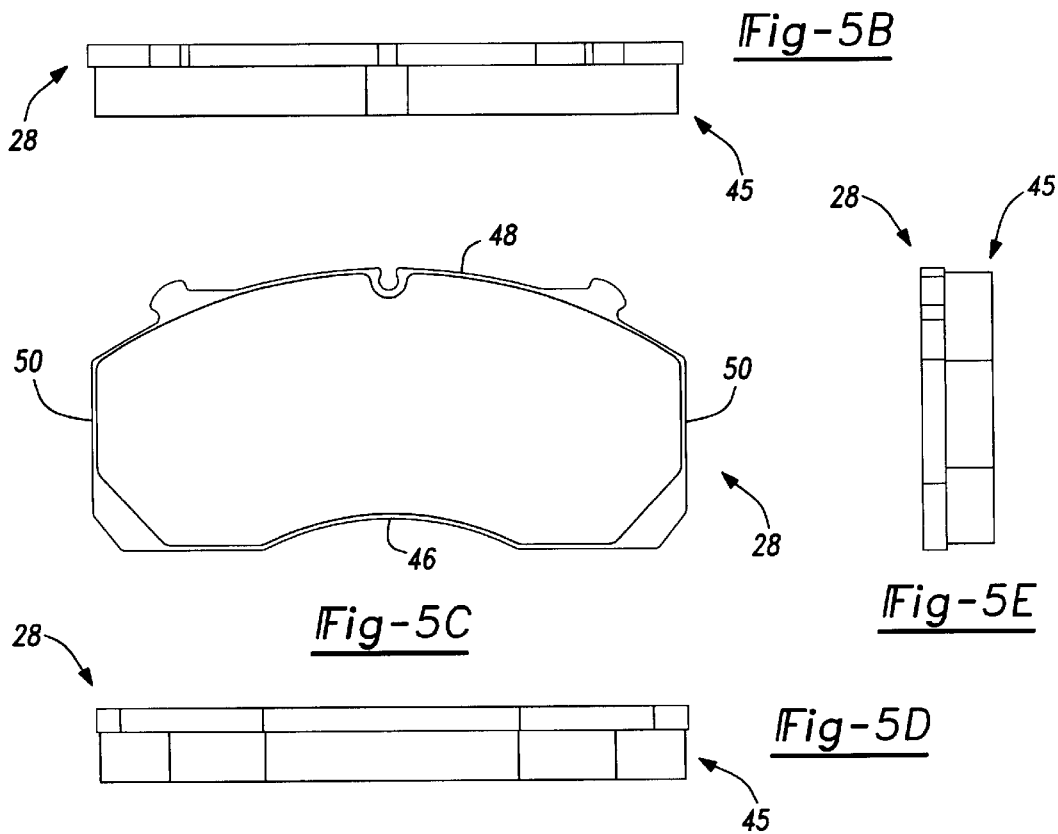
Fig-5B
Fig-5C
Fig-5D
Fig-5E

DISC BRAKE BACKING PLATES

BACKGROUND OF THE INVENTION

This invention relates to improvements in the design of shoe and lining assemblies for use in disc brakes.

Disc brakes are utilized in many heavy vehicle braking systems. Typically, an air actuator is driven to rotate an eccentric piston actuator. Typically there are two spaced pistons. The pistons are actuated to drive a disc brake shoe and lining assembly into contact with a rotor. The rotor rotates with the wheel, and when the shoe and lining assembly is brought into contact with the rotor, it retards rotation of the wheel.

Modern braking systems are quite complex and carry a number of relatively moving parts. The brake assembly, including its several components, must fit within the envelope of the wheel for which the brake is associated. As such, there are competing demands on the brake designer.

With regard to the shoe and lining assemblies, it is desirable to have the pistons be as close to a centroid of one-half of the shoe and lining assembly as is possible. However, existing disc brake systems have not fully achieved this goal.

SUMMARY OF THE INVENTION

In disclosed embodiments of this invention, the shape and dimensions of a saddle or seat for the shoe and lining assembly is designed to result in pistons which are centered close to a true centroid of one-half of the shoe and lining assembly. The force from the pistons is thus distributed as evenly as possible across the shoe and lining assembly. In this way, the braking force applied to the shoe and lining assembly is applied as evenly as possible across the entire friction surface, and braking efficiency is increased.

The present invention evaluates the competing space challenges of having sufficient size for the housing structure, actuation structure, supporting structure, and shoe and lining assemblies. In addition, the present invention evaluates the complete design to result in piston centroids which are as close as possible to a centroid of one-half of the shoe and lining assembly.

While the invention is claimed as a combination of shapes and dimensions of the shoe and lining assemblies, in fact a good deal of the inventive effort is in the creation of the surrounding brake which results in the particular shape and dimensions for the shoe and lining assembly:

These and other features of the present invention are best understood from the following specification and drawings, of which the following is a brief description.

BRIEF DESCRIPTION OF THE DRAWINGS

FIGS. 3A shows a disc brake shoe and lining assembly for a wheel having a diameter of 17.5".

FIG. 3B is a top view of the shoe and lining assembly in the FIG. 3A brake.

FIG. 3C is a front view of the shoe and lining assembly of FIG. 3A.

FIG. 3D is a bottom view of the shoe and lining assembly of FIG. 3A.

FIG. 3E is a side view of the shoe and lining assembly of FIG. 3A.

FIG. 4A is a view of a disc brake and shoe and lining assembly for a wheel having a diameter of 19.5".

FIG. 4B is a top view of the shoe and lining assembly of FIG. 4A.

FIG. 4C is a front view of the shoe and lining assembly of FIG. 4A.

FIG. 4D is a bottom view of the shoe and lining assembly of FIG. 4A.

FIG. 4E is a side view of the shoe and lining assembly of FIG. 4A.

FIG. 5A is a view of a disc brake and shoe and lining assembly for a wheel having a diameter of 22.5".

FIG. 5B is a top view of the shoe and lining assembly of FIG. 5A.

FIG. 5C is a front view of the shoe and lining assembly of FIG. 5A.

FIG. 5D is a bottom view of the shoe and lining assembly of FIG. 5A.

FIG. 5E is a side view of the shoe and lining assembly of FIG. 5A.

DETAILED DESCRIPTION OF A PREFERRED EMBODIMENT

Figure 1:
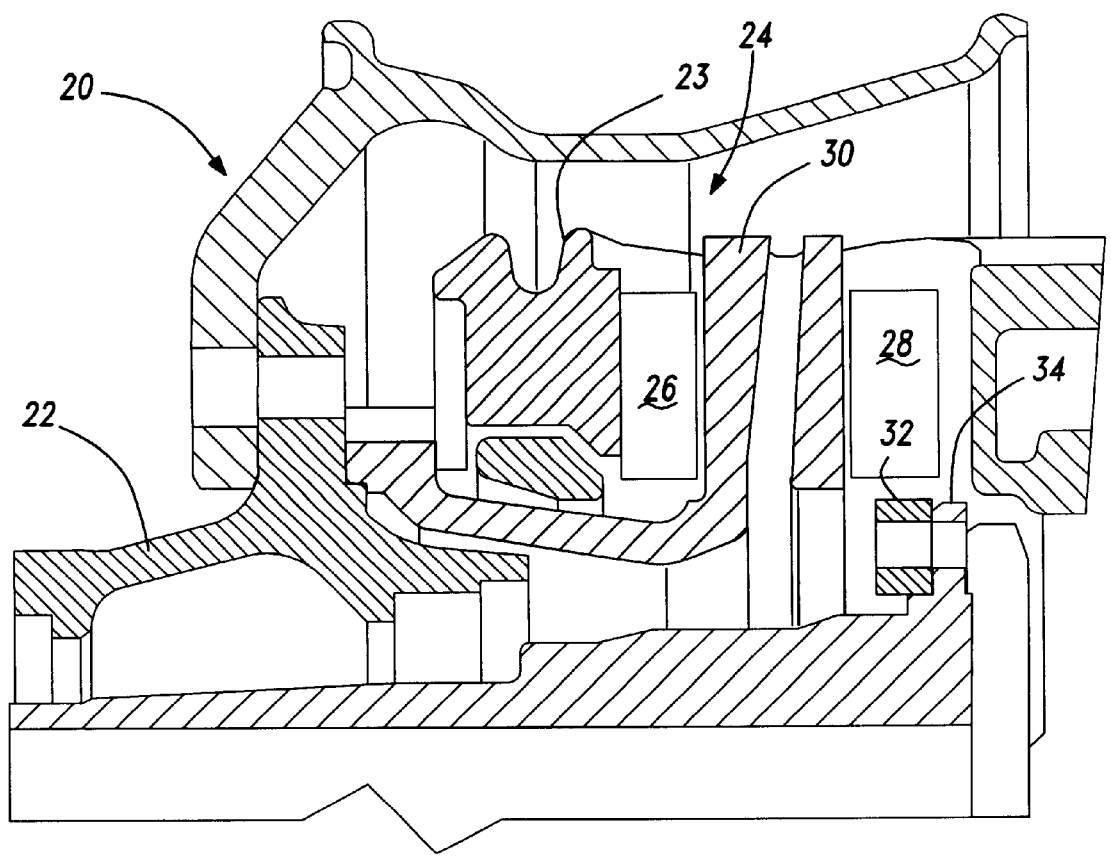
FIG. 1 is a somewhat schematic view through a disc braking system.

FIG. 1 shows a wheel assembly 20 with a disc brake 24 incorporating a housing 23. Shoe and lining assemblies 26 and 28 are movable within the housing toward and away from a rotor 30. Rotor 30 rotates with a wheel hub 22. When the shoe and lining assemblies 26 and 28 are brought into contact with the rotor 30, rotation of the wheel hub 22 is slowed.

FIG. 1 is a somewhat schematic view of a brake assembly. The disc brake structure of the present invention does not change functionally with regard to its basic components, and thus this drawing is not meant to explain the complete operation of the system. Instead, this drawing does show the challenges on the disc brake designer. There are members radially outwardly and radially inwardly of the shoe and lining assemblies 26 and 28. As an example, a torque plate 32 and a knuckle 34 are positioned radially inwardly of one of the shoe and lining assemblies 28. The overall envelope size for any particular sized wheel is dictated by the outer diameter of that wheel and its associated rotor. As such, there is not unlimited space for designing the brake components.

Figure 2:
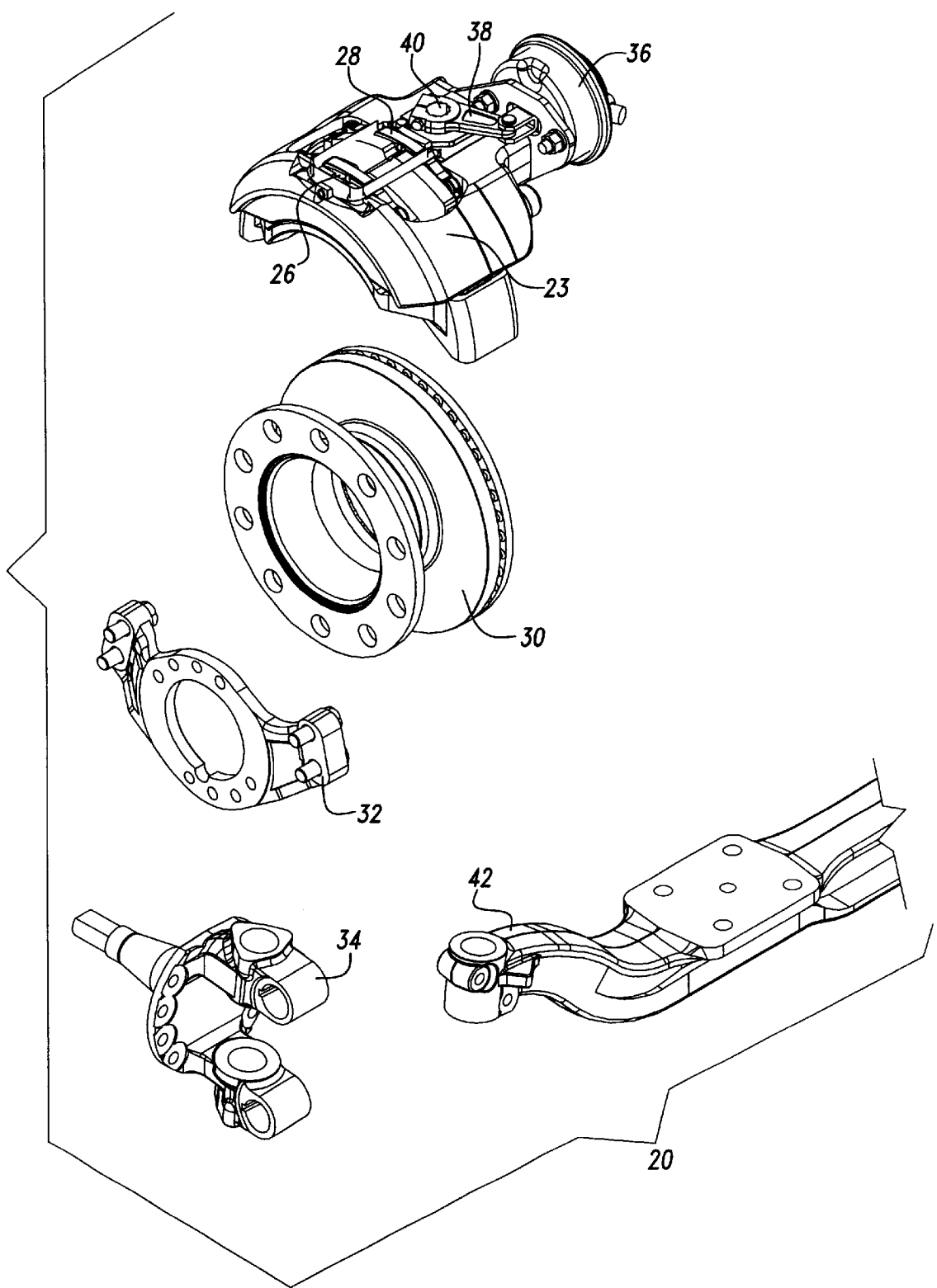
FIG. 2 is an exploded view showing components of a disc brake system.

FIG. 2 is an exploded view of the wheel end assembly 20. The disc brake housing 23 receives the shoe and lining assemblies 26 and 28. Torque plate 32 and knuckle 34 are shown. An air actuator 36 drives a lever 38, as known, to turn an eccentric actuator 40. Upon turning eccentric actuator 40, pistons are driven to force the shoe and lining assembly into braking engagement with the rotor 30, again as known. In addition, an axle beam 42 is connected to knuckle 34, and further requires space within the envelope of the window.

As shown in FIG. 3A, the housing 23 for a brake to be utilized on a wheel having an outer diameter of 17.5" has a seat 19 receiving a shoe and lining assembly 28. An outer spring member 44 holds the shoe and lining assembly 28 within its seat 19. The spring requires space radially outwardly of the shoe and lining assembly, thus further limiting the freedom of the disc brake designer. Friction material 45 is placed upon the face of a backing plate which together form shoe and lining assembly 28 which faces the rotor.

As shown in FIG. 3A, $r_1$ is the inner diameter of the wheel. This dimension is fixed by the wheel, and is part of the operational envelope for the brake. Similarly, $r_2$ is the inner diameter of the rotor and the inner curve of the backing plate. Structure radially inwardly of $r_2$ prevents the shoe and lining assembly from extending radially inwardly into this area. $r_3$ defines the outer diameter rotor and the top curve on the shoe and lining assembly 28 for this particular wheel.

In the brake having a 17.5" diameter, $r_1$ is 183 mm. $r_2$ is 89 mm. The inventive backing plate has $r_3$ being 168 mm. Thus, the distance between a point A and a point B on the shoe and lining assembly 28, and along a line extending from a centroid of the wheel envelope through a center of the shoe and lining assembly is $r_3-r_2$ or 94 mm.

The width $w_1$ of the backing plate 28 is further dictated by the need to have sufficient material outwardly of each side of the shoe and lining assembly such that the housing is structurally sound.

Ideally, the shoe and lining assembly 28 is sized such that the backing plate could be divided symmetrically along the center line between points A and B, and a centroid of each half of the backing plate is the centroid of the actuating piston. This would result in an even force spread across the backing plate and its friction material evenly. However, the disc brake designer generally wishes to maximize the distance between points A and B to provide additional friction material, and cannot always extend the distance $w_1$ to result in sufficient width for the backing plate such that the piston could always be centered on the centroid c of the backing plate.

The present invention results in a backing plate having centroid c as close as possible to the centroid of the actuating piston. In the FIG. 3A embodiment, the width $w_1$ is 179.4 mm.

With the particular disc brake backing plate, there is an actuator envelope d that the pistons must avoid. That is, the actuator is moving within the space shown between the lines identified by d. Thus, the pistons must be placed outwardly of that envelope, and at least some small clearance must also be provided. To that end, and as shown, the distance $w_2$ to the centroid of the piston is slightly greater than the distance $W_3$ to the centroid of the backing plate. Further, as shown, a height $h_1$ to the centroid of the piston is less than the height $h_2$ to the centroid c of the backing plate. In the particular embodiment, the dimension $w_2$ is 47.5 mm., the dimension $W_3$ is 41.6 mm. The dimension $h_1$ is 115 mm. The dimension $h_2$ is 122.5 mm.

In general, the backing plate ideally has $h_1$ and $h_2$ equal and $w_1$ and $w_2$ equal. This is difficult to achieve in practice. The distance between points A and B and the dimension $w_1$ set the centroid of the backing plate. Thus, the invention has disclosed backing plate dimensions that achieve the ideal position as close as possible.

As shown in FIG. 3B, friction material 45 extends outwardly of the backing plate 28. The backing plate has a thickness of 7.0 mm, and the friction material has an initial thickness of 19.0 mm.

FIG. 3C shows shoe and lining assembly 28. As shown, there is a curve 46 on the bottom of the backing plate with flats on either side of the curve 46. A top curve 48 is formed on the backing plate and extends between sides 50. The curves 46 and 48 are centered on a common center.

FIG. 3D is a bottom view of the shoe and lining assembly, and shows the friction material extending from the backing plate.

FIG. 3E is a side view of the shoe and lining assembly and further shows the friction material 45. With the inventive backing plate shape and dimensions, the centroids of the pistons are close to the centroid c of the backing plate, and thus the forces are relatively evenly distributed. At the same time, sufficient space is provided for a combination of actuation structure that is necessary for operation of the brakes.

As shown in FIG. 4A, the housing 23 for a brake to be utilized on a wheel having an outer diameter of 19.5" has a seat 19 receiving a backing plate 28. An outer spring member 44 holds the backing plate 28 within its seat 19.

As shown in FIG. 4A, $r_1$ is again the inner diameter of the wheel. Similarly, $r_2$ is again the inner diameter of the rotor and the bottom edge of the backing plate. $r_3$ defines the outer diameter of the rotor and the top curve on the backing plate for this particular wheel.

In the brake for a wheel having a 19.5" diameter, $r_1$ is 208 mm. The inventive braking plate has a $r_2$ value of 109 mm and a $r_3$ value of 188.5 mm. Thus, the distance between a point A and a point B on the backing plate of shoe and lining assembly 28, and along a line extending from a centroid of the wheel envelope through a center of the backing plate is $r_3-r_2$ or 79.5 mm.

The present invention results in a backing plate having centroid c as close as possible to the centroid of the actuating piston. In the FIG. 4A embodiment, the width $w_1$ is 205.4 mm.

The pistons must avoid an actuator envelope d. The height $h_1$ to the centroid of the piston is close in this embodiment to the height $h_2$ to the centroid c of the backing plate. In the particular embodiment, the dimension $w_2$ is 56.3 mm., the dimension $W_3$ is 49.2 mm. The dimension $h_1$ is 140 mm and $h_2$ is 139.8 mm.

As shown in FIG. 4B, the friction material 45 extends outwardly of the backing plate 28. The backing plate has a thickness of 7.0 mm, and the friction material has an initial thickness of 20.0 mm.

FIG. 4C shows shoe and lining assembly 28. As shown, there is a curve 46 on the bottom of the backing plate with flats on either side of the curve 46. A top curve 48 is formed on the backing plate and extends between sides 50. The curves 46 and 48 are centered on a common center.

FIG. 4D is a bottom view of the shoe and lining assembly, and shows the friction material extending from the backing plate.

FIG. 4E is a side view of the shoe and lining assembly and further shows the friction material 45. With the inventive backing plate shape and dimensions, the centroids of the pistons are close to the centroid c of the backing plate, and thus the forces are relatively evenly distributed. At the same time, sufficient space is provided for a combination of actuation structure that is necessary for operation of the brakes.

As shown in FIG. 5A, the housing 23 for a brake to be utilized on a wheel having an outer diameter of 22.5" has a seat 19 receiving a shoe and lining assembly 28. An outer spring member 44 holds the shoe and lining assembly 28 within its seat 19.

As shown in FIG. 5A, $r_1$ is the inner diameter of the wheel hub. Similarly, $r_2$ is the inner diameter of the backing plate and rotor. $r_3$ defines the outer extent of a top curve on the backing plate 28 and the rotor for this particular wheel.

In the brake having a 22.5" diameter, $r_1$ is 243.8 mm. The inventive backing plate has an $r_2$ of 116 mm and an $r_3$ of 219 mm. Thus, the distance between a point A and a point B on the backing plate, and along a line extending from a centroid of the wheel envelope through a center of the backing plate is $r_3-r_2$ or 103 mm.

The present invention results in a backing plate having centroid c as close as possible to the centroid of the actuating piston. In the FIG. 5 embodiment, the width $w_1$ is 248.9 mm.

There is again an actuator envelope d that the pistons must avoid. To that end, and as shown, the distance $w_2$ to the centroid of the piston is slightly greater than the distance $w_3$ to the centroid of the backing plate. Further, as shown, a height $h_1$ to the centroid of the piston is greater than the height $h_2$ to the centroid c of the backing plate. In the particular embodiment, the dimension $w_2$ is 60.0 mm., the dimension $w_3$ is 57.3 mm. The dimension $h_1$ is 161.0 mm. The dimension $h_2$ is 159.4 mm.

As shown in FIG. 5B, the friction material 45 extends outwardly of the backing plate. The backing plate has a thickness of 7.0 mm, and the friction material has an initial thickness of 23.0 mm.

FIG. 5C shows shoe and lining assembly 28. As shown, there is a curve 46 on the bottom of the backing plate with flats on either side of the curve 46. A top curve 48 is formed on the backing plate and extends between sides 50. The curves 46 and 48 are centered on a common center.

FIG. 5D is a bottom view of the shoe and lining assembly, and shows the friction material extending from the backing plate.

FIG. 5E is a side view of the shoe and lining assembly and further shows the friction material 45. With the inventive backing plate shape and dimensions, the centroids of the pistons are close to the centroid c of the backing plate, and thus the forces are relatively evenly distributed. At the same time, sufficient space is provided for a combination of actuation structure that is necessary for operation of the brakes.

While the dimensions are given for the backing plates, and are the most preferred dimensions, the backing plates according to this invention can have actual dimensions that differ slightly. Thus, in the claims, Applicant claims dimensions, with a factor of 5 mm on either side of the dimension to cover variations.

Preferred embodiments of this invention have been disclosed, however, a worker of ordinary skill in the art would recognize certain modifications would come within the scope of this invention. For that reason the following claims should be studied to determine the true scope and content of this invention.

What is claimed is:

1. A shoe and lining assembly for use in a disc brake associated with a wheel having an outer diameter of approximately 17.5" comprising:

a backing plate body carrying a friction material, said backing plate body having a radially inner curve portion and a radially outer curve portion, said inner and outer curves being centered on a common center, a radius from said center to said inner curve being approximately 89 mm, and a radius from said center to said outer curve being approximately 168 mm, said backing plate having side edges generally connecting said outer and inner curves, with said inner curve having straight bottom flats extending from ends of said inner curve to join said side edges, and a width being defined between said side edges, said width being approximately 179.4 mm, with the term approximately as used in this claim being taken at ±5 mm.

2. A shoe and lining assembly for use in a disc brake associated with a wheel having an outer diameter of approximately 19.5" comprising:

a backing plate body carrying a friction material, said backing plate body having a radially inner curve and a radially outer curve, said inner and outer curves centered on a common center, a radius from said center to said inner curve being approximately 109 mm, and a radius from said center to said outer curve being approximately 188.5 mm, said backing plate having side edges generally connecting said outer and inner curve, with said inner curve having straight bottom flats extending from ends of said inner curve to join said side edges, and a width being defined between said side edges, said width being approximately 205.4 mm with the term approximately as used in this claim being taken as ±5 mm.

3. A shoe and lining assembly for use in a disc brake associated with a wheel having an outer diameter of approximately 22.5" comprising:

a backing plate body carrying a friction material, said backing plate body having a radially inner curve and a radially outer curve, said inner and outer curves centered on a common center, a radius from said center to said inner curve being approximately 116 mm, and a radius from said center to said outer curve being approximately 219 mm, said backing plate having side edges generally connecting said inner and outer curves, with said inner curve having straight bottom flats extending from ends of said inner curve to join said side edges, and a width being defined between said side edges, said width being approximately 248.9 mm, with the term approximately as used in this claim being taken as ±5 mm.

* * * * *

UNITED STATES PATENT AND TRADEMARK OFFICE
CERTIFICATE OF CORRECTION

PATENT NO. : 6,374,959 B1 Page 1 of 1
DATED : April 23, 2002
INVENTOR(S) : Joseph A. Kay It is certified that error appears in the above-identified patent and that said Letters Patent is hereby corrected as shown below:

<u>Title page,</u>
Insert Item [60] as follows:
-- (60) Provisional application No. 60/048,390 filed on March 6, 1997. --

Signed and Sealed this

Twenty-first Day of January, 2003

JAMES E. ROGAN
*Director of the United States Patent and Trademark Office*